US006950203B1

United States Patent
Akabane et al.

(10) Patent No.: US 6,950,203 B1
(45) Date of Patent: Sep. 27, 2005

(54) PRINT SYSTEM AND PRINT SYSTEM CONTROL METHOD

(76) Inventors: Tatsuro Akabane, c/o Hitachi Koki Co., Ltd., 1060, Takeda, Hitachinaka-shi, Ibaraki (JP); Seiji Kageyama, c/o Hitachi Koki Co., Ltd., 1060, Takeda, Hitachinaka-shi, Ibaraki (JP); Katsumi Kumagai, c/o Hitachi Koki Co., Ltd., 1060, Takeda, Hitachinaka-shi, Ibaraki (JP); Masamitsu Suzuki, c/o Hitachi Koki Co., Ltd., 1060, Takeda, Hitachinaka-shi, Ibaraki (JP)

( * ) Notice: Subject to any disclaimer, the term of this patent is extended or adjusted under 35 U.S.C. 154(b) by 0 days.

(21) Appl. No.: 09/518,099

(22) Filed: Mar. 3, 2000

(30) Foreign Application Priority Data

Mar. 4, 1999 (JP) ............................................. 11-056648
Dec. 17, 1999 (JP) ............................................. 11-358894

(51) Int. Cl.[7] ........................... G06K 15/02; G06F 3/12; G06F 13/00
(52) U.S. Cl. ...................... 358/1.15; 358/1.13; 358/1.14
(58) Field of Search ................................. 358/1.15, 1.9, 358/1.13, 1.18, 1.17, 501, 504, 524, 401, 403, 437, 448, 452; 382/112, 305, 306

(56) References Cited

U.S. PATENT DOCUMENTS

| 6,089,765 | A  | * | 7/2000  | Mori ........................... 400/61 |
| 6,160,629 | A  | * | 12/2000 | Tang et al. .................. 358/1.1 |
| 6,320,667 | B1 | * | 11/2001 | Mitsuhashi ................. 358/1.1 |
| 6,337,747 | B1 | * | 1/2002  | Rosenthal .................. 358/1.15 |
| 6,459,497 | B1 | * | 10/2002 | Kashiwazaki .............. 358/1.15 |

FOREIGN PATENT DOCUMENTS

EP      0 773 498 A1      5/1997       G06F/3/12

* cited by examiner

Primary Examiner—Douglas Tran

(57) ABSTRACT

In a print system comprising a computer and a printer connected to the computer, a logical printer driver makes print instructions of a prepared document, prepares a PDL document and print information from the document, and spools as a print job, a spool control section transfers the spooled print job to a PDL processing section, which then processes the PDL document in accordance with the print information and transfers the PDL document to an interpreter, which then interprets the PDL document, expands the PDL document into a dot image, and stores the dot image in an output work, and an output control section sends the dot image to a print engine for printing the document in the specified format from the computer.

31 Claims, 20 Drawing Sheets

FIG. 6

| ITEM | | SETTING | | SETTING EXAMPLE | |
|---|---|---|---|---|---|
| | | CONTENTS | VALUE | CONTENTS | VALUE |
| 800 — PRINT MODE | PRINT | NO | 0 | YES | ModeP = 1 |
| 801 — | | YES | 1 | | |
| | STORAGE | NO | 0 | YES | ModeA = 1 |
| 802 — | | YES | 1 | | |
| 810 — STORAGE FORMAT | PDL | NO | 0 | YES | ArchiveP = 1 |
| 811 — | | YES | 1 | | |
| | DOT IMAGE | NO | 0 | YES | ArchiveD = 1 |
| 812 — | | YES | 1 | | |
| 820 — NUMBER OF COPIES | | | INTEGER | 1 COPY | Copy = 1 |
| 830 — PAPER SIZE | | A4 | 0 | A3 | PAPER SIZE = 1 |
| | | A3 | 1 | | |
| | | B5 | 2 | | |
| | | B4 | 3 | | |
| 840 — PAPER FEED SECTION | | PAPER FEED SECTION 1 | 0 | PAPER FEED SECTION 1 | INPUT = 0 |
| | | PAPER FEED SECTION 2 | 1 | | |
| 850 — PAPER DISCHARGE SECTION | | PAPER DISCHARGE SECTION 1 | 0 | PAPER DISCHARGE SECTION 1 | OUTPUT = 0 |
| | | PAPER DISCHARGE SECTION 2 | 1 | | |
| 861 — | | | | | |
| 860 — OUTPUT FORMAT | | STANDARD | 0 | 2 UP | TYPE = 1 |
| 862 — | | 2 UP | 1 | | |
| 863 — | | 4 UP | 2 | | |
| 864 — | | SADDLE STITCH | 3 | | |
| 870 — DOUBLE-SIDE PRINT | | NO | 0 | YES | DUPLEX = 1 |
| | | YES | 1 | | |
| 880 — BINDING POSITION | | LEFT TO RIGHT | 0 | LEFT TO LIGHT | TUMBLE = 1 |
| | | UP TO BOTTOM | 1 | | |
| 890 — STAPLE | | NONE | 0 | UPPER-LEFT CORNER | STAPLE = 1 |
| | | UPPER-LEFT CORNER | 1 | | |
| | | TWO-CENTER PARTS | 2 | | |
| | | UPPER-RIGHT CORNER | 3 | | |

FIG. 14

| | PRINT INFORMATION | | | SETTING EXAMPLE | |
|---|---|---|---|---|---|
| SETTING ITEM | CONTENTS | | VALUE | CONTENTS | VALUE |
| 1400 PRINT MODE | PRINT | | 1 | PRINT & STORAGE | PRINT MODE = 3 |
| | STORAGE | | 2 | | |
| 1410 | PRINT & STORAGE | | 3 | | |
| 1410 NUMBER OF COPIES | n | | INTEGER | 3 COPIES | COPIES = 3 |
| 1420 PRINT IN COPY UNITS | YES | | 1 | YES | COLLATE = 1 |
| | NO | | 0 | | |
| 1430 PAPER THICKNESS | THIN | | 1 | THIN | PAPER THICK = 1 |
| | NORMAL | | 2 | | |
| | THICK | | 3 | | |
| 1440 PAPER FEED SECTION | AUTOMATIC SELECTION | | 0 | PAPER FEED SECTION 1 | INPUT TYPE = 1 |
| | PAPER FEED SECTION 1 | | 1 | | |
| | PAPER FEED SECTION 1 | | 2 | | |
| 1450 PAPER DISCHARGE SECTION | AUTOMATIC SELECTION | | 0 | PAPER DISCHARGE SECTION 2 | OUTPUT TYPE = 2 |
| | PAPER DISCHARGE SECTION 1 | | 1 | | |
| | PAPER DISCHARGE SECTION 1 | | 2 | | |
| 1460 SINGLE SIDE/DOUBLE SIDE PRINT | AUTOMATIC SELECTION | | 0 | DOUBLE SIDE PRINT | DUPLEX = 1 |
| | SINGLE SIDE PRINT | | 0 | | |
| | DOUBLE SIDE PRINT | | 1 | | |
| 1470 BINDING POSITION (EFFECTIVE ON THE DOUBLE SIDE PRINT) | LONG-SIDE BINDING | | 0 | LONG-SIDE BINDING | TUMBLE = 0 |
| | SHORT-SIDE BINDING | | 1 | | |
| 1480 PAPER DISCHARGE OFFSET | YES | | 1 | YES | OUTPUT OFFSET = 1 |
| | NO | | 0 | | |
| 1490 STAPLE | NONE | | 0 | NONE | STAPLE = 0 |
| | UPPER-LEFT CORNER OF PAPER IN PORTABLE ORIENTATION | | 1 | | |
| | UPPER-LEFT CORNER OF PAPER IN LANDSCAPE ORIENTATION | | 2 | | |
| | TWO-CENTER PARTS | | 3 | | |
| 1500 PUNCH HOLE | NONE | | 0 | 2 HOLES | PUNCH = 2 |
| | 2 HOLES | | 2 | | |
| | 3 HOLES | | 3 | | |
| 1510 FOLD | NONE | | 0 | NONE | FOLD = 2 |
| | FOLD IN TWO | | 1 | | |
| | FOLD IN Z | | 2 | | |
| 1520 PAGE ASSIGNMENT | 1 UP | | 1 | 4 UP | ASSIGN PAGES = 4 |
| | 2 UP | | 2 | | |
| | 4 UP | | 4 | | |
| | SADDLE STITCH | | 101 | | |
| 1530 PAGE ASSIGNMENT TYPE | TYPE 1 | | 1 | NONE | ASSIGN TYPE = 1 |
| | TYPE 2 | | 2 | | |
| | TYPE 3 | | 3 | | |
| | TYPE 4 | | 4 | | |
| 1540 PRINT DATA STORAGE LOCATION | FILE NAME | | | c:¥arc¥file1.ps | |

FIG. 20

| Print information details | |
|---|---|
| | Page assignment |
| Paper thickness — 1810 | Automatic selection ▼ |
| Paper feed section — 1820 | Automatic selection ▼ |
| Paper discharge section — 1830 | Automatic selection ▼ |
| Single side/double side print — 1840 | ⦿ Single side  ○ Double side |
| Binding position (Effective on double side print) — 1850 | ⦿ Long side binding  ○ Short side binding |
| Paper discharge offset — 1860 | ○ Yes  ⦿ No |
| Staple — 1870 | None ▼ |
| Punch Hole — 1880 | No ▼ |
| Fold — 1890 | None ▼ |

[ OK ]   [ Cancel ]   [ Reset ]

FIG. 26

| PRINT INFORMATION | | | SETTING EXAMPLE | |
|---|---|---|---|---|
| SETTING ITEM | CONTENTS | VALUE | CONTENTS | VALUE |
| PRINT MODE | PRINT | 1 | PRINT | PRINT MODE = 1 |
| | STORAGE | 2 | | |
| | PRINT & STORAGE | 3 | | |
| NUMBER OF COPIES | n | INTEGER | 1 COPY | COPIES = 1 |
| PRINT IN COPY UNITS | YES | 1 | YES | COLLATE = 1 |
| | NO | 0 | | |
| PAPER THICKNESS | THIN | 1 | AUTOMATIC SELECTION | PAPER THICK = 0 |
| | NORMAL | 2 | | |
| | THICK | 3 | | |
| | AUTOMATIC SELECTION | 0 | | |
| PAPER FEED SECTION | PAPER FEED SECTION 1 | 1 | AUTOMATIC SELECTION | INPUT TYPE = 0 |
| | PAPER FEED SECTION 1 | 2 | | |
| | AUTOMATIC SELECTION | 0 | | |
| PAPER DISCHARGE SECTION | PAPER DISCHARGE SECTION 1 | 1 | AUTOMATIC SECTION | OUTPUT TYPE = 0 |
| | PAPER DISCHARGE SECTION 1 | 2 | | |
| | AUTOMATIC SELECTION | 0 | | |
| SINGLE SIDE/DOUBLE SIDE PRINT | SINGLE SIDE PRINT | 0 | SINGLE SIDE PRINT | DUPLEX = 0 |
| | DOUBLE SIDE PRINT | 1 | | |
| BINDING POSITION (EFFECTIVE ON THE DOUBLE SIDE PRINT) | LONG-SIDE BINDING | 0 | LONG-SIDE PRINT | TUMBLE = 0 |
| | SHORT-SIDE BINDING | 1 | | |
| PAPER DISCHARGE OFFSET | YES | 1 | NO | OUTPUT OFFSET = 0 |
| | NO | 0 | | |
| STAPLE | NONE | 0 | NONE | STAPLE = 0 |
| | UPPER-LEFT CORNER OF PAPER IN PORTABLE ORIENTATION | 1 | | |
| | UPPER-LEFT CORNER OF PAPER IN LANDSCAPE ORIENTATION | 2 | | |
| | TWO-CENTER PARTS | 3 | | |
| PUNCH HOLE | NONE | 0 | NONE | PUNCH = 0 |
| | 2 HOLES | 2 | | |
| | 3 HOLES | 3 | | |
| FOLD | NONE | 0 | NONE | FOLD = 0 |
| | FOLD IN TWO | 1 | | |
| | FOLD IN Z | 2 | | |
| PAGE ASSIGNMENT | 1 UP | 1 | 1 UP | ASSIGN PAGES = 1 |
| | 2 UP | 2 | | |
| | 4 UP | 4 | | |
| | SADDLE STITCH | 101 | | |
| PAGE ASSIGNMENT TYPE | TYPE 1 | 1 | TYPE 1 | ASSIGN TYPE = 1 |
| | TYPE 2 | 2 | | |
| | TYPE 3 | 3 | | |
| | TYPE 4 | 4 | | |
| PRINT DATA STORAGE LOCATION | FILE NAME | | c:\arc\file1.ps | |

PRINT SYSTEM AND PRINT SYSTEM CONTROL METHOD

BACKGROUND OF THE INVENTION

1. Field of the Invention

This invention relates to a printer and more particularly to a print system which can provide printouts in various formats such as double-sided print and multipage output to a sheet of paper and again print a stored print job and a control method of the print system.

2. Description of the Related Art

Hitherto, a PDL (page description language) document processed into a format to be output has been prepared by a logical printer driver of a computer and has been sent to a printer. The processed PDL document or dot image has been stored in an archive as a print job and has been printed in the stored format intact.

Hitherto, a printer has been unable to process in a PDL document or dot image and a PDL document processed into a format to be output has been prepared by a logical printer driver of a computer. Thus, the PDL document or dot image stored in an archive has already been processed. It is difficult to restore the processed PDL document or dot image to a standard format; likewise, it is also difficult to restore the processed PDL document or dot image to a different format. Thus, the stored print job can be printed only in the stored format intact, which is a problem.

A problem of placing a large processing burden on a computer also arises.

SUMMARY OF THE INVENTION

It is therefore an object of the invention to provide a print system for enabling the processing burden on a computer to be lightened and a print job stored in an archive to be reprinted with the format or the number of copied changed as many times as necessary for enhancing the user's convenience and the ease-of-use of the print system.

The following print systems and methods are adopted in the present invention.

A first print system according to the invention comprises a computer and a printer connected directly to the computer or indirectly to the computer via a network, characterized in that a logical printer driver makes print instructions of a prepared document, prepares a PDL document and print information from the document, and spools as a print job, that a spool control section transfers the spooled print job to a PDL processing section, which then processes the PDL document in accordance with the print information and transfers the PDL document to an interpreter, which then interprets the PDL document, expands the PDL document into a dot image, and stores the dot image in an output work, and that an output control section sends the dot image to a print engine for printing the document in the specified format from the computer.

A second print system according to the invention is characterized in that a spool control section stores a print job in an archive, that a computer makes print instruction through a print instruction section, that the print instruction section updates print information of the print job, that an archive control section spools the print job, that a spool control section transfers the spooled print job to a PDL processing section, which then processes the PDL document in accordance with the print information and transfers the PDL document to an interpreter, which then interprets the PDL document, expands the PDL document into a dot image, and stores the dot image in an output work, and that an output control section sends the dot image to a print engine for reprinting the print job stored in the archive in the specified format from the computer.

A third print system according to the invention comprises a computer and a printer connected directly to the computer or indirectly to the computer via a network, characterized in that a logical printer driver makes print instructions of a prepared document, prepares a PDL document and print information from the document, and spools as a print job, that a spool control section transfers the spooled print job to an interpreter, which then interprets the PDL document, expands the PDL document into a dot image, and stores the dot image in an output work, and that an output control section stores the dot image stored in the output work and the print information in an archive as the print job.

A fourth print system according to the invention is characterized in that a computer makes print instruction through a print instruction section, that the print instruction section updates print information of a print job, that an archive control section spools the print job, that a spool control section transfers the spooled print job to a dot image processing section, which then processes dot image in accordance with the print information and stores the dot image in an output work, and that an output control section reprints the print job stored in archive in the specified format from the computer.

A fifth print system according to the invention is characterized in that a computer makes print instruction through a print instruction section, that the print instruction section updates print information of a print job, that an archive control section spools the print job, that a spool control section transfers the spooled print job to a PDL processing section if the print data is PDL and the spooled print job to a dot image processing section if the print data is a dot image, that the PDL processing section processes the PLD in accordance with the print information and stores the PDL in an output work, that the dot image processing section processes the dot image in accordance with the print information and stores the dot image in the output work, and that an output control section sends the dot image to a print engine for reprinting the print job stored in archive in the specified format from the computer.

A sixth print system according to the invention is characterized in that an archive is provided for storing a pair of PDL document and printer information and a pair of dot image and print information as print job and that the print job stored in the archive is reprinted in the specified format from a computer.

A seventh print system according to the invention is characterized in that a computer calls standard print information of a print job existing in an archive or already registered print information from a print instruction section and changes based on the called information for registering and using a plurality of pieces of print information for one print data piece with another name or by overwriting.

An eighth print system according to the invention is characterized in that a computer selects print information registered in a print job existing in an archive from a print instruction section and reprints the print job in the format of the print information.

A ninth print system according to the invention is characterized in that a computer sends a reprint instruction to an archive control section from a print instruction section, that the archive control section describes the storage location of print data in print information and spools only the print information through a spool control section, and that a dot image processing section or a PDL processing section accesses the print data whose storage location is described in the print information of the received print job for reprinting the print job in the format of the print information.

BRIEF DESCRIPTION OF THE DRAWINGS

FIG. 6 is a drawing to show the print instruction contents.

FIG. 14 is a drawing to show the detailed print instruction contents.

FIG. 20 is a drawing to show a detailed instruction screen displayed resulting from selecting a detail button on the instruction screen in FIG. 18.

FIG. 26 is a drawing to show the detailed print instruction contents of standard print information.

DETAILED DESCRIPTION OF THE PRESENT INVENTION

Embodiments of the present invention will be described in detail with reference to the accompanying drawings.

Figure 1:
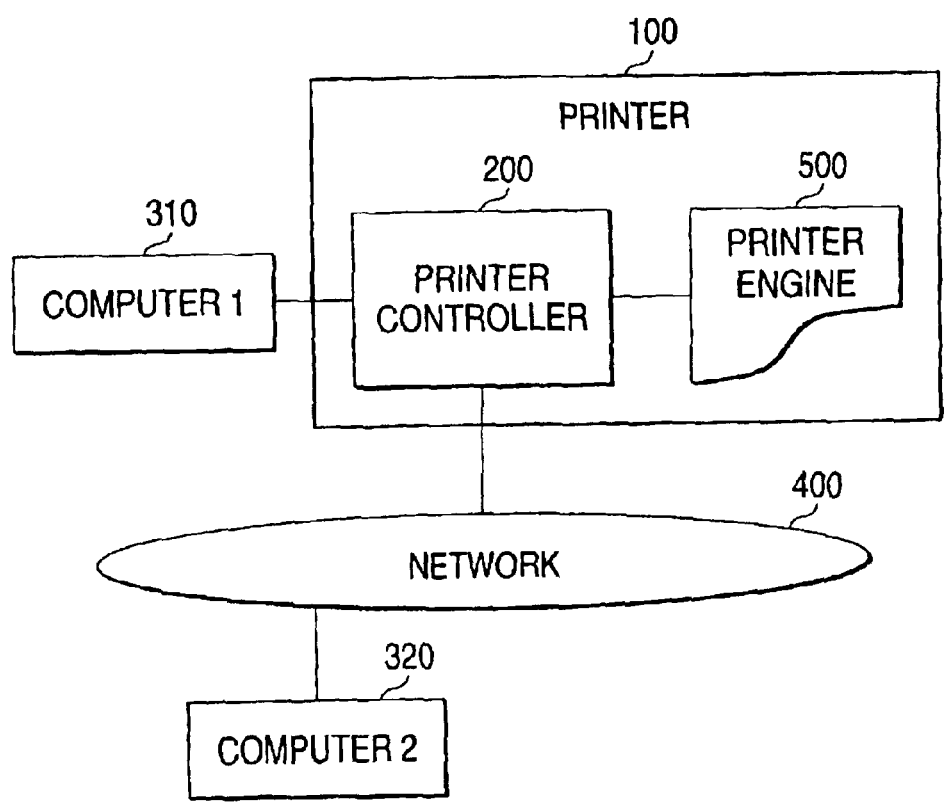
FIG. 1 is a schematic drawing of the whole of a print system of the invention.

First, the general configuration of a print system of the invention will be discussed with reference to FIG. 1.

The print system of the invention comprises a network 400, a second computer 320 and a printer 100 connected to the network 400, and a first computer 310 connected to the printer 100. The printer 100 comprises a printer controller 200 for controlling the printer 100 and a printer engine 500 for performing a printing. The computers 310 and 320 have the same function although the first computer 310 is connected to the printer 100 and the second computer 320 is connected to the network 400. Therefore, the first computer 310 and the second computer 320 will be hereinafter described as a computer 300 as in FIGS. 2, 12 and 13.

A first embodiment of the invention will be discussed in detail.

Figure 2:
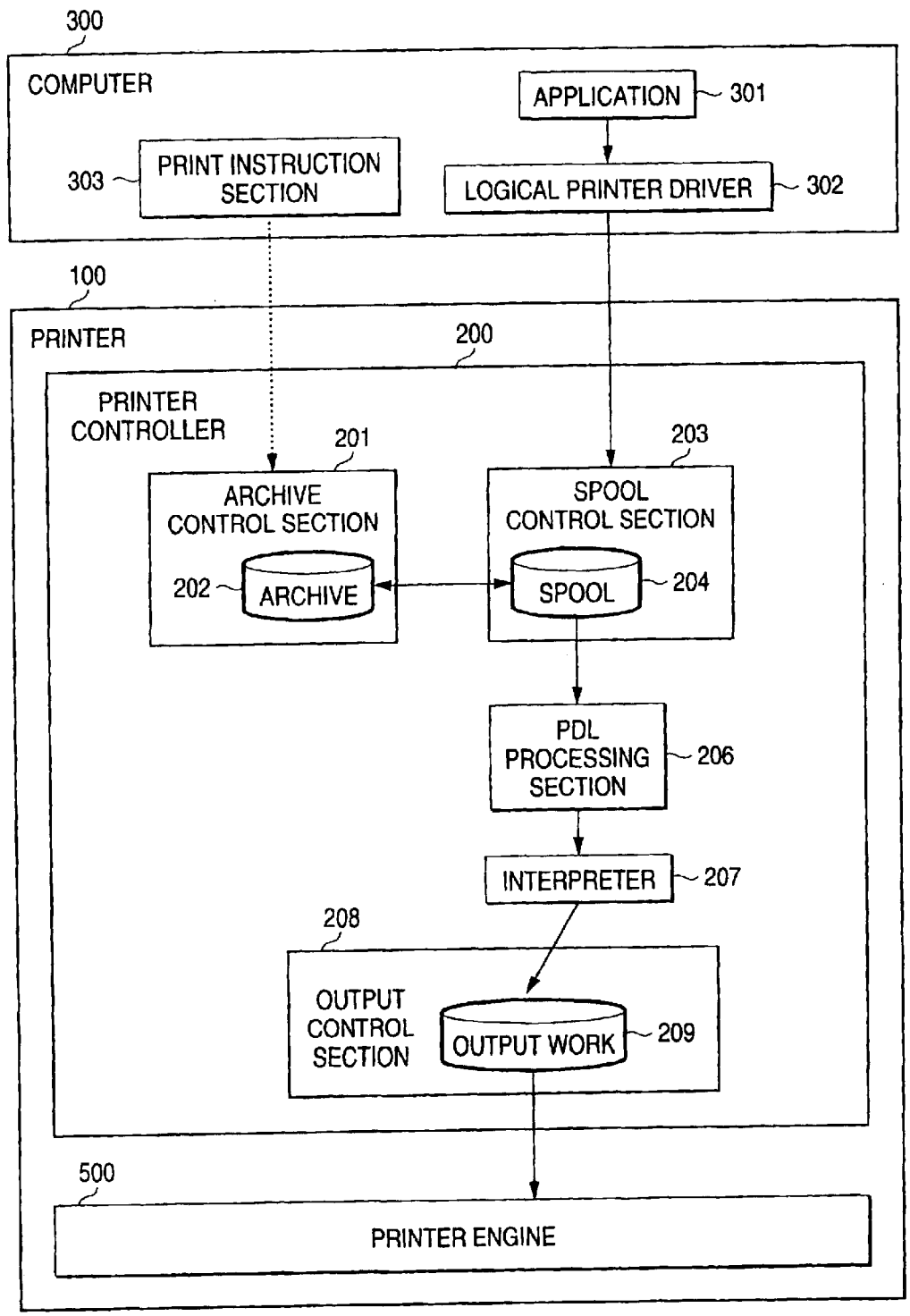
FIG. 2 is a detailed block diagram of the print system for processing a PDL.

First, the configuration of the computer 300 will be discussed with FIG. 2. The computer 300 comprises a print instruction section 303, an application 301, and a logical printer driver 302. To print a document prepared in the application 301, the logical printer driver 302 is used for instruction.

Figure 3:
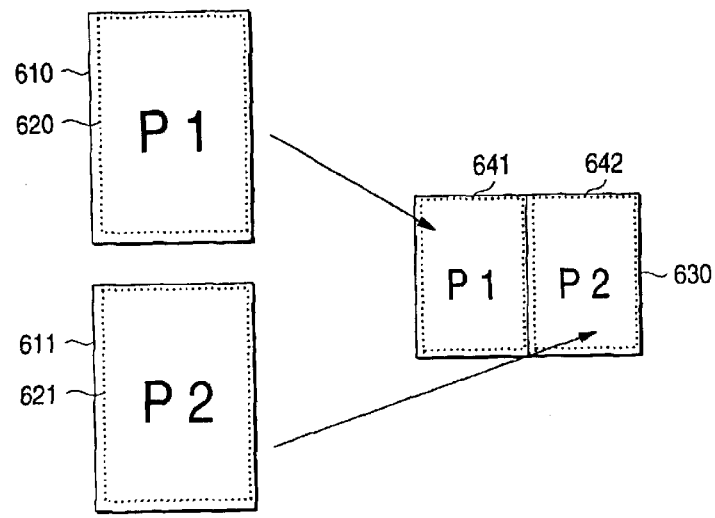
FIG. 3 is a schematic representation of 2UP.
Figure 4:
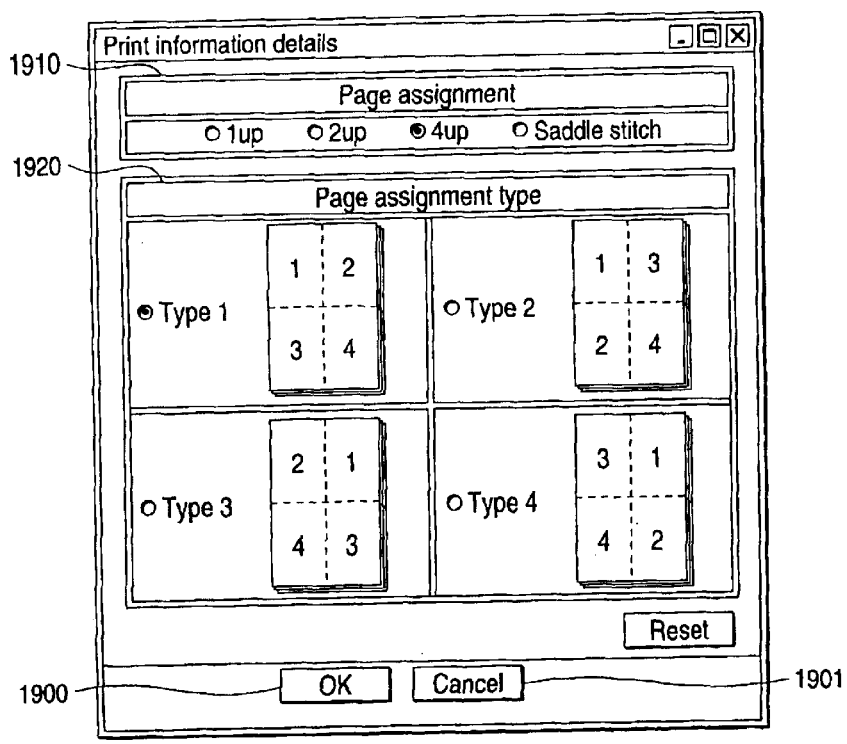
FIG. 4 is a schematic representation of saddle stitch.
Figure 5:
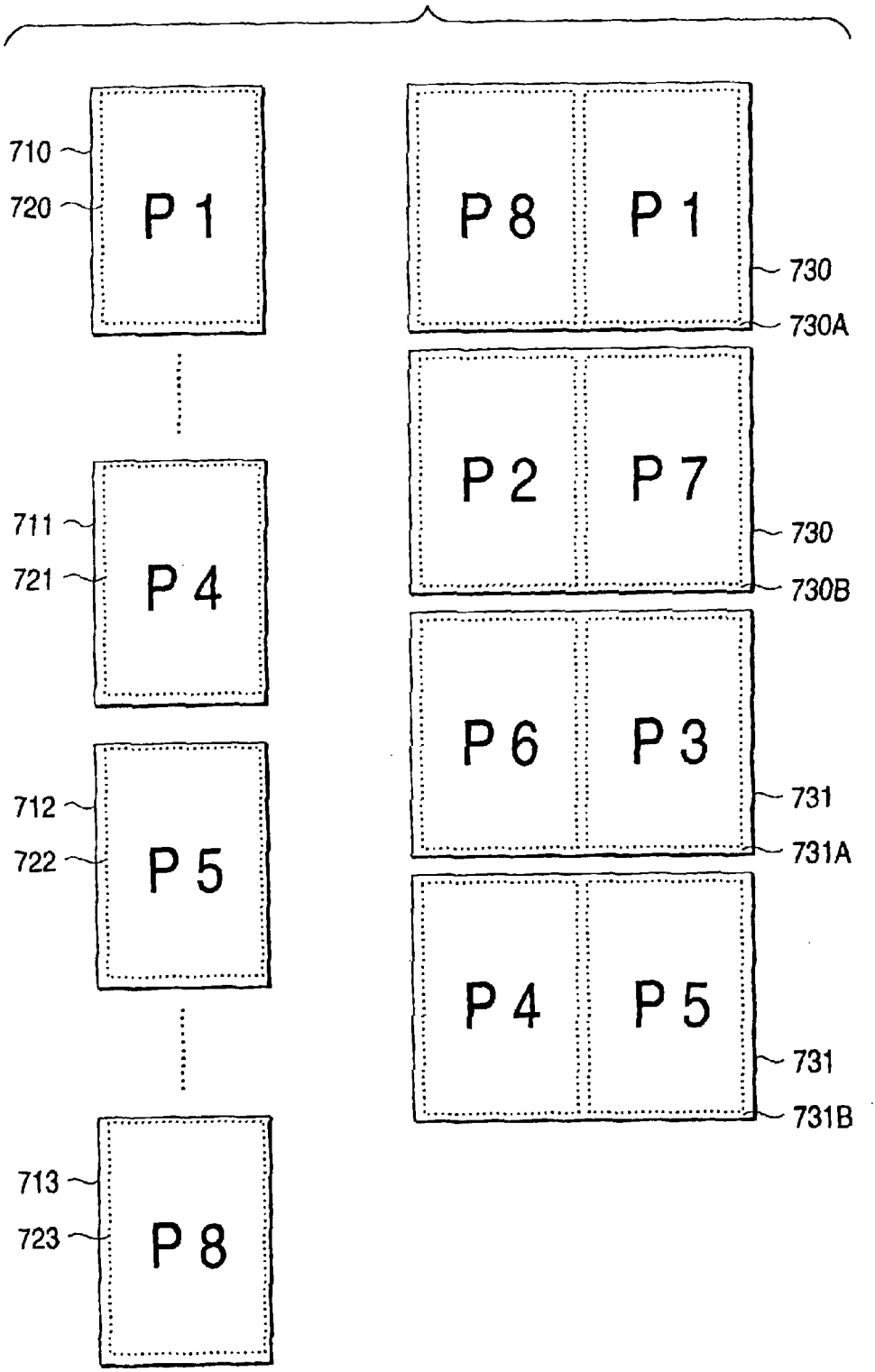
FIG. 5 is a schematic diagram of a method of preparing saddle stitch.

The instruction contents will be discussed in detail with FIG. 6. The instruction contents include a print mode 800, a storage format 820, the number of copies 820, a paper size 830, a paper feed section 840, a paper discharge section 850, an output format 860, a double-sided print 870, a binding position 880, and a staple 890. The print mode 800 is further classified into print 801 and storage 802. The print 801 specifies whether or not a print job transmitted to the printer 100 is to be printed on a paper. The print job represents data required for being printed by the printer. The storage 802 specifies whether or not a print job transmitted to the printer 100 is to be stored in the printer 100. The storage format 810 is classified into a PDL (page description language) 811 and a dot image 811. The PDL 811 specifies whether or not a PDL document is to be stored. The dot image 812 specifies whether or not a dot image which is a format capable of being output to the printer engine is to be stored. The number of copies 820 sets the number of print copies. The paper size 830 sets the paper used for the printing. The paper feed section 840 specifies which of paper storage units to store papers to be printed in the printer 100 is to be used. The paper discharge section 850 specifies which of printed paper storage units to store the printed paper in the printer 100 is to be used. The output format 860 is classified into standard 861, 2UP 862, 4UP 863, and saddle stitch 864. The standard 861 will be discussed with FIG. 3. It is a standard output format for outputting drawing 620 of one page of a PDL document to paper 610. The 2UP 862 will also be discussed with FIG. 3. Normally, drawing 620 of one page of a PDL document is output to a paper 610 and drawing 621 of one page of a PDL document is output to a paper 611. To save papers, etc., drawing 640 of one page of a PDL document and drawing 641 of one page of a PDL document are output in a reduced scale so as to be fitted into a paper 630. This format is the 2UP 862. The 4UP 863 is a format for outputting four pages of a PDL document to one side of one sheet of paper by a similar method to that of the 2UP 862. The saddle stitch 864 will be discussed with FIGS. 4 and 5. In the description, the document is assumed to be an eight-page document having eight pages for easy understanding, but the eight-page document is not an essential condition. In the standard printing, a drawing 720 of one page of a PDL document is output to a paper 710 in FIG. 5. A similar manner is applied to the second and later pages. In the saddle stitch 864, the eighth page and the first page are output to a rear side 730A of paper 730, as shown in FIG. 5.

Likewise, the second page and the seventh page are output to a front side 730B of the paper 730, the sixth page and the third page are output to a rear side 731A of paper 731, and the fourth page and the fifth page are output to a front side 731B of the paper 731. Next, as shown in FIG. 4, the paper 730 and the paper 731 are put on each other and bound at center parts, for example, like a binding 770 and a binding 771. Next, the paper is folded in two at the center of the paper, for example, like a fold 760. Resultantly, a book is prepared. Such printing is the saddle stitch 864. The double-sided print 870 specifies whether or not double-sided print is to be executed. The binding position 880 sets the binding position if the double-sided print is executed. If left to right is selected, drawing orientations on the front and rear sides become the same. If top to bottom is selected, the drawing orientation on the rear side becomes upside-down. The staple 890 sets the staple position.

Figure 11:
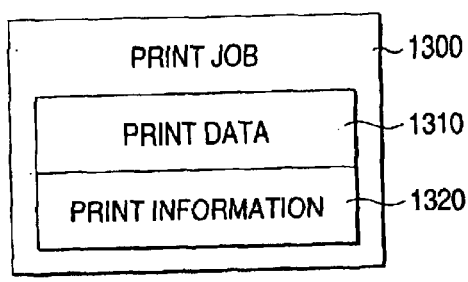
FIG. 11 is a drawing to show the configuration of a print job.

The logical printer driver converts data of the application into a print job 1300 shown in FIG. 11 and stores the print job 1300 in a spool 204. The print job 1300 comprises print information 1320 recording the print instruction contents and print data 1310 of the PDL recording the drawing contents. When the print job 1300 is stored in the spool 204, a spool control section 203 interprets the print information 1320. First, the print information 1320 is checked on the print mode 800. If the storage 802 is not set to store the print job in the printer 100 (Setting contents=No), no operation is performed. If the storage 802 is set to store the print job in the printer 100 (Setting contents=Yes), the storage format 810 is checked. If the PDL 811 is not set to store the PDL document (Setting contents=No), no operation is performed. If the PDL 802 is set to store the PDL document (Setting contents=Yes), the print job 1300 is copied into an archive 202 and is stored therein. Next, the print 801 is checked. If the print 801 is not set to print the print job onto the sheet (Setting contents=No), no operation is performed. If print 801 is set to print the print job onto the sheet (Setting contents=Yes), the print job 1300 is sent to a PDL processing section 206, which then processes the print data 1310 in accordance with the output format 860 in the print information 1320.

Figure 7:
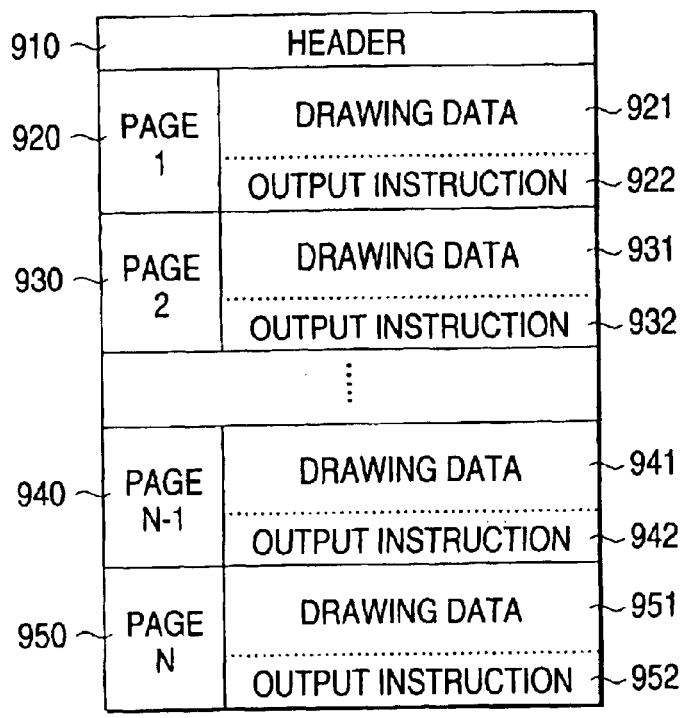
FIG. 7 is a drawing to show the PDL contents.

Here, as a processing example, processing of 2UP will be discussed with reference to FIGS. 7 and 8. First, the format of the print data 1310 of the PDL will be discussed. The print data 1310 is in a general PDL format as shown in FIG. 7. The print data 1310 begins with a header 910. Generally, a print execution user name, application name, and the like are described in the header 910. The header 910 is followed by data concerning page 1 (920) to page N (950). The data concerning each page is similar and the page 1 (920) is used to describe the format. The page 1 (920) comprises drawing data 921 describing drawing on the page 1 in a programming language and an output instruction 922 indicating the end of the page 1 (920). If the page 1 (920) does not contain the output instruction 922, it is not output even if the drawing data 921 is executed.

Figure 8:
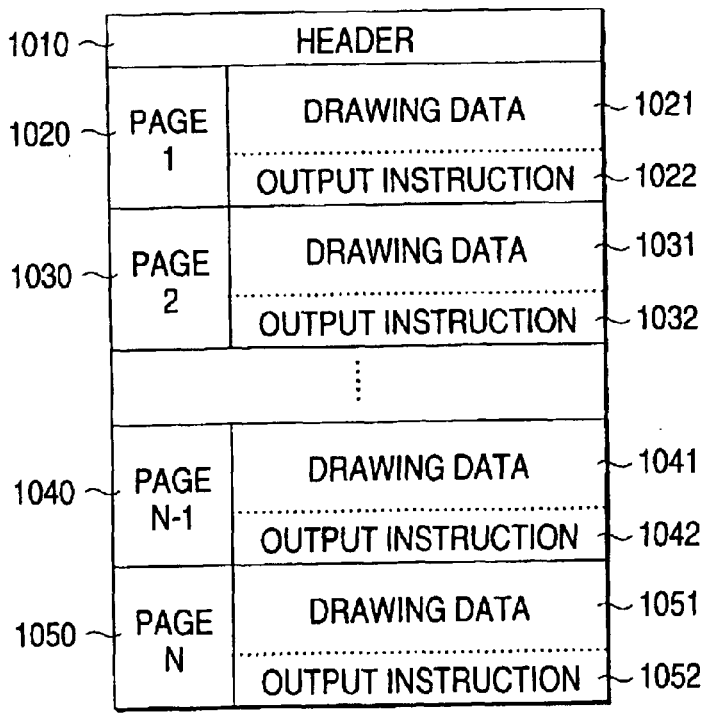
FIG. 8 is a drawing to show the print data contents provided by processing the PDL in FIG. 7 to 2UP.

FIG. 8 shows the print data 1310 in FIG. 7 processed to the 2UP. Since an output instruction 1022 is deleted, drawing data 1021 is not output and subsequently drawing data 1031 on page 2 (1030) is executed. Since the page 2 (1030) contains an output instruction 1032, here the drawing data 1021 on page 1 (1020) and the drawing data 1031 on the page 2 (1030) are output together. Likewise, the subsequent data is output for two pages at a time up to page N (1050).

The print job 1300 thus processed is sent to an interpreter section 207, which then expands the print job 1300 into a dot image of a format that can be output to a print engine 500, and stores the dot image in an output work 209. When the dot image is stored in the output work 209, the output control section 208 outputs the dot image output to the print engine 500. Hitherto, the logical printer driver 302 has processed the print data 1310, thus a large processing burden has been placed on the computer, taking time until the release of the print processing. According to the invention, the print data 1310 is processed in the printer 100, thus the processing burden on the computer 300 is lightened and the print processing time is shortened.

Next, a method of again printing the print job 1300 stored in the archive 202 will be discussed.

To again print the print job, the print instruction section 303 is used for instruction. The instruction contents are the same as those previously described with reference to FIG. 5. The print information 1320 of the print job 1300 stored by the archive control section 201 is overwritten with the instruction contents and the print job 1300 containing the instruction contents is stored in the spool 204. The stored print job 1300 is processed in a similar manner to that as the print job is stored from the logical printer driver 302 described above. Thus, needs for outputting in various formats in response to the application in the print system are high and the PDL needs to be processed. However, the PDL is provided for outputting one page to one sheet of paper and is not intended for outputting more than one page to one sheet of paper. Thus, it is extremely difficult to restore the format processed so as to describe two or more pages into the original format or a different format. Hitherto, the logical printer driver has processed print data, thus stored print data has already been processed and unable to be again printed in a different format and has been again printed only in the stored format. To print the print data in a different format, it has been necessary to again output the print data from the beginning from application. In the invention, the print job prepared by the logical printer driver is separated into print data and print information and standard print data is prepared. To store the print job, the standard print job is stored as the original and when the print job is actually printed, the print data is processed in accordance with the print information, whereby the print job can be reprinted in the format responsive to the application as many times as required.

A second embodiment of the invention will be discussed in detail with reference to FIG. 12.

Figure 12:
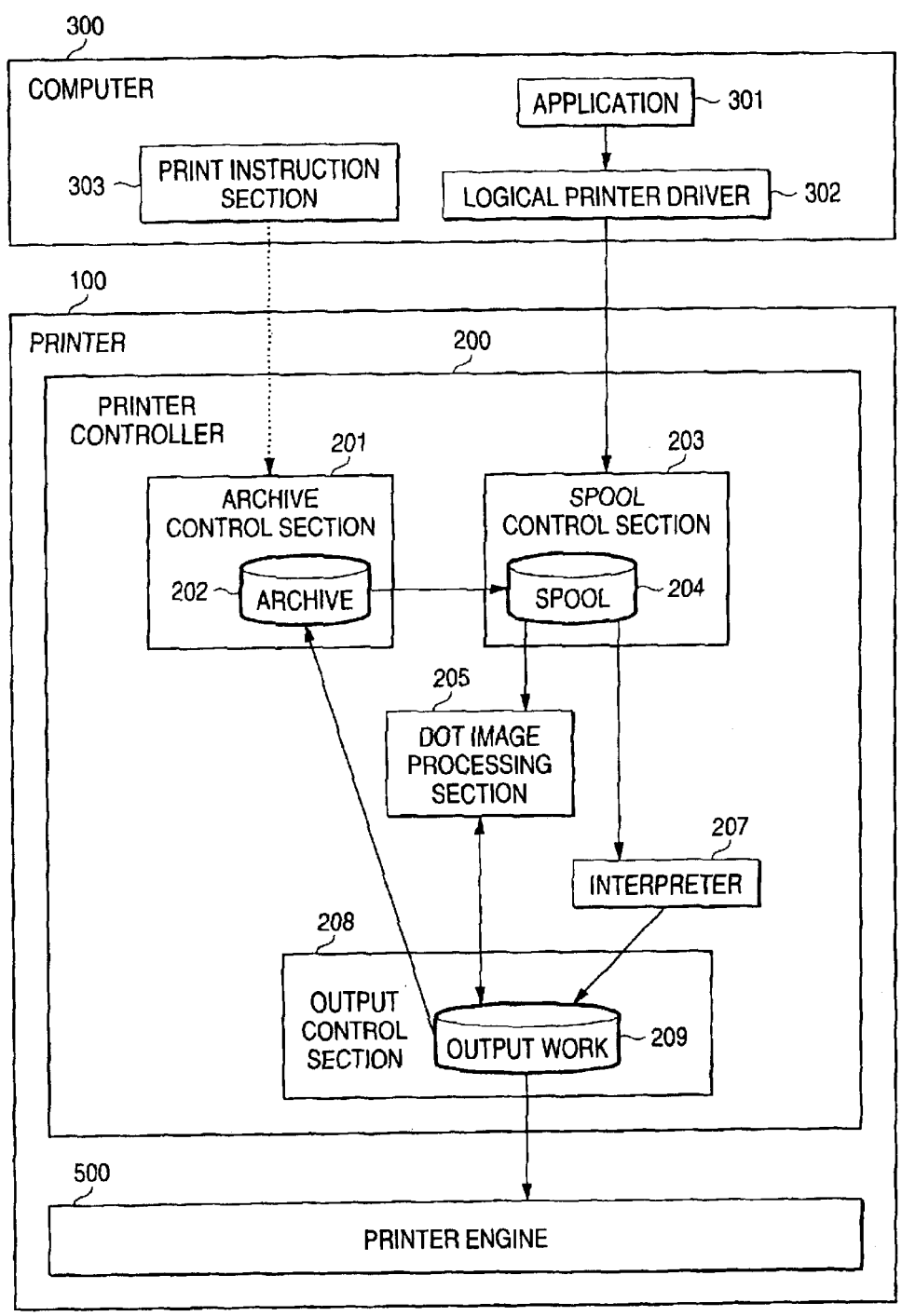
FIG. 12 is a detailed block diagram of a print system for processing a dot image.

As shown in FIG. 12, a print job 1300 prepared by a logical printer driver 302 is stored in a spool 204 and is sent to an interpreter section 207, as previously described in the first embodiment. The print data of the sent print job 1300 is converted into a dot image and print data 1310 is overwritten with the print data in the dot image, then the print data in the dot image is stored in an output work 209. An output control section 208 interprets print information 1320. First, the print information 1320 is checked on a print mode 800. If the storage 802 is not set to store the print job in the printer (Setting contents=No), no operation is performed. If the storage 802 is set to store the print job in the printer (Setting contents=Yes), a storage format 810 is checked. If the dot image 812 is not set to store the dot image (Setting contents=No), no operation is performed. If the dot image 812 is set to store the dot image (Setting contents=Yes), the print job 1300 is copied into an archive 202 and is stored therein. Next, the print 801 is checked. If the print 801 is not set to print the print job onto the sheet (Setting contents= No), no operation is performed. If the print 801 is set to print the print job onto the sheet (Setting contents=Yes), the print job 1300 is sent to a dot image processing section 205, which then processes the print data 1310 in accordance with an output format 860 in the print information 1320.

Figure 9:
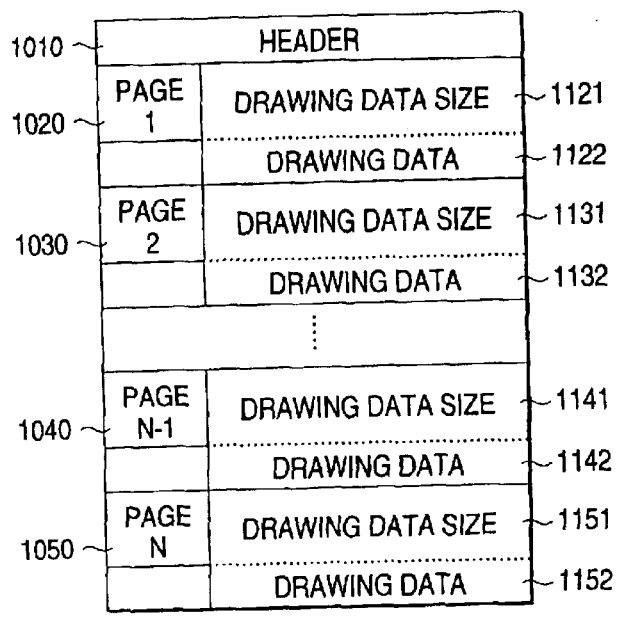
FIG. 9 is a drawing to show the dot image contents.
Figure 10:
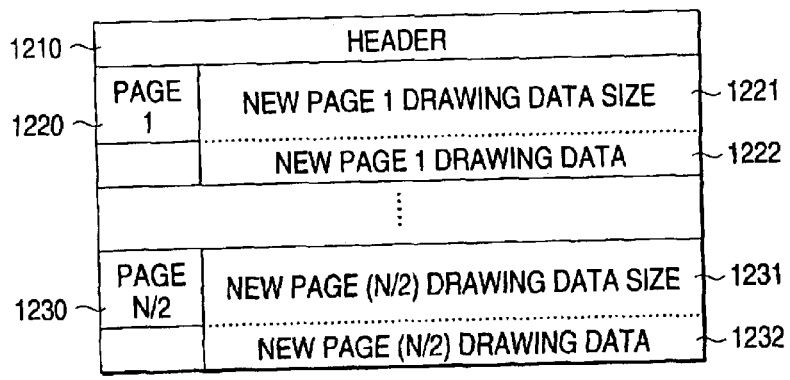
FIG. 10 is a drawing to show the print data contents provided by processing the dot image in FIG. 9 to 2UP.

Here, as a processing example, processing of the 2UP will be discussed with reference to FIGS. 9 and 10. First, the format of the print data 1310 of dot image will be discussed. The print data 1310 is in a general dot image format as shown in FIG. 9. The print data 1310 begins with a header 1110. Generally, a print execution user name, application name, and the like are described in the header 1110. The header 1110 is followed by data concerning page 1 (1120) to page N (1150). The data concerning each page is similar and the page 1 (1120) is used to describe the format. The page 1 (1120) consists of page 1 drawing data 1122 describing drawing on the page 1 in a binary format and page 1 drawing data size 1121 indicating the size of the data. FIG. 10 shows the print data 1310 in FIG. 9 processed to the 2UP. New page 1 (1220) comprises a listing of the page 1 (1120) and page 2 (1130). New page 1 drawing data size indicates the total size of the page 1 drawing data size 1121 and page 2 drawing data size 1131, and new page 1 drawing data 1222 is provided by combining the page 1 drawing data 1122 and page 2 drawing data 1132. Likewise, the subsequent data is arranged for two pages at a time to new page 2 (1150). The print job 1300 containing the print data 1310 thus processed is sent to the output work 209. The output control section 208 outputs the print data 1310 to a print engine 500 in accordance with the print information 1320.

Thus, needs for outputting in various formats in response to the application in the print system are high and the dot image needs to be processed. However, it is extremely difficult to restore the combined and processed dot image to the original or convert the combined and processed dot image into a different format. Hitherto, stored print data has already been processed and unable to be again printed in a different format and has been again printed only in the stored format. To print the print data in a different format, it has been necessary to again output the print data from the beginning from the application. In the invention, to store the print job, the standard print job is stored as the original and when the print job is actually printed, the print data is processed in accordance with the print information, whereby the print job can be reprinted in the format responsive to the application as many times as required. The dot image is in the format in which it can be output to the printer engine intact, and the dot image is stored in the format, thus making it possible to print the dot image at high speed.

A third embodiment of the invention will be discussed in detail.

Figure 13:
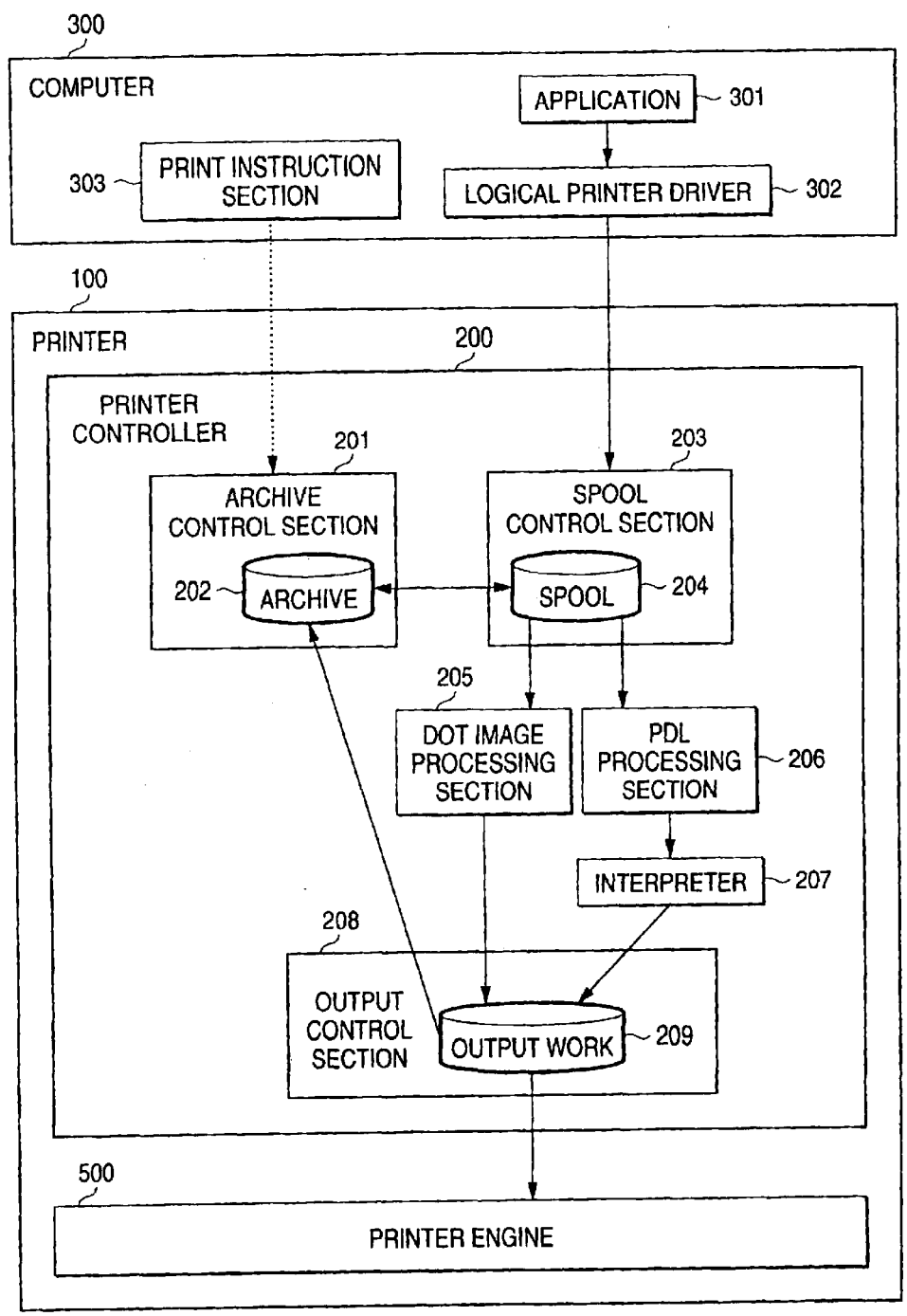
FIG. 13 is a detailed block diagram of a print system for processing a PDL and a dot image.

As shown in FIG. 13, a print system of the third embodiment has both the PDL processing section 206 described in the first embodiment and the dot image processing section 205 described in the second embodiment and can store either or both of PDL and dot image in an archive 202. Generally, the PDL has the advantage that if data in the PDL is enlarged or reduced, image quality degradation is small, etc., but has the disadvantage that data in the PDL is converted into a dot image by an interpreter 207 and thus the print time is prolonged, etc. The dot image has the advantage that the dot image is in the format in which it can be output to a printer engine intact and thus the print time is short, etc., but has the disadvantage that if the size is change, image quality degradation is large, etc. In the invention, full advantages of both the PDL and the dot image are taken; if the PDL is used, reprinting can be executed with high priority given to the image quality and if the dot image is used, reprinting can be executed at high speed.

A fourth embodiment of the invention will be discussed in detail.

Figure 15:
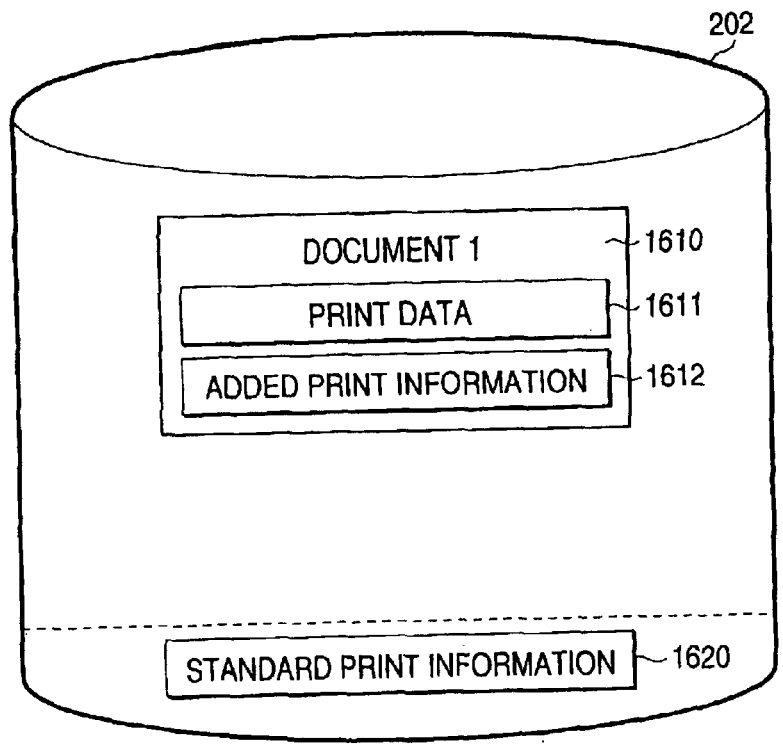
FIG. 15 is a drawing to show a general format of a document registered in an archive.
Figure 16:
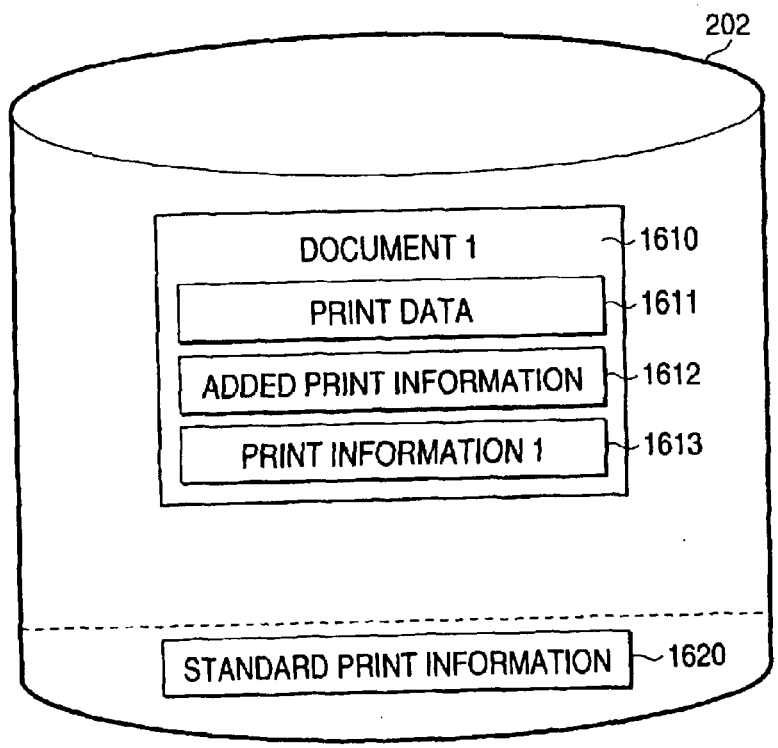
FIG. 16 is a drawing to show a state in which print information is added to the document in FIG. 15.
Figure 18:
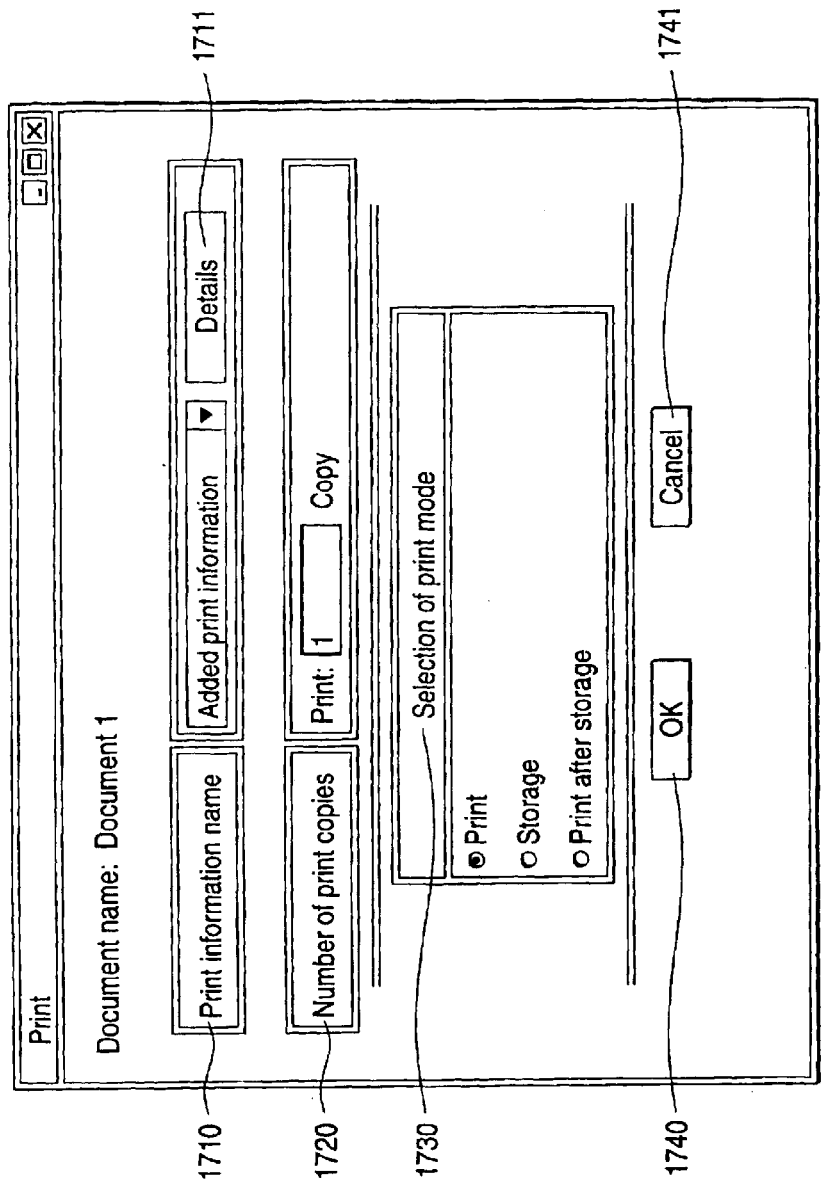
FIG. 18 is a drawing to show an instruction screen for reprinting the document in the archive.
Figure 19:
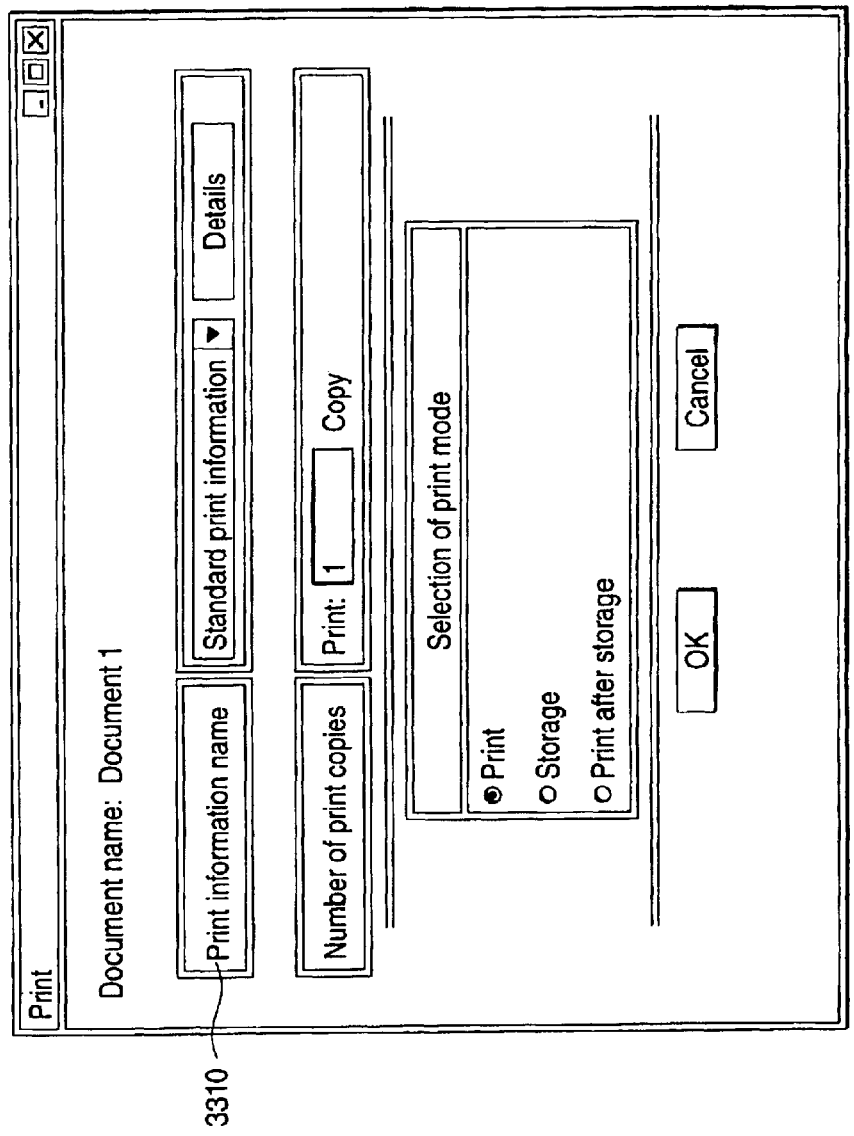
FIG. 19 is a drawing to show a screen produced by selecting standard print information on the instruction screen in FIG. 18.
Figure 21:
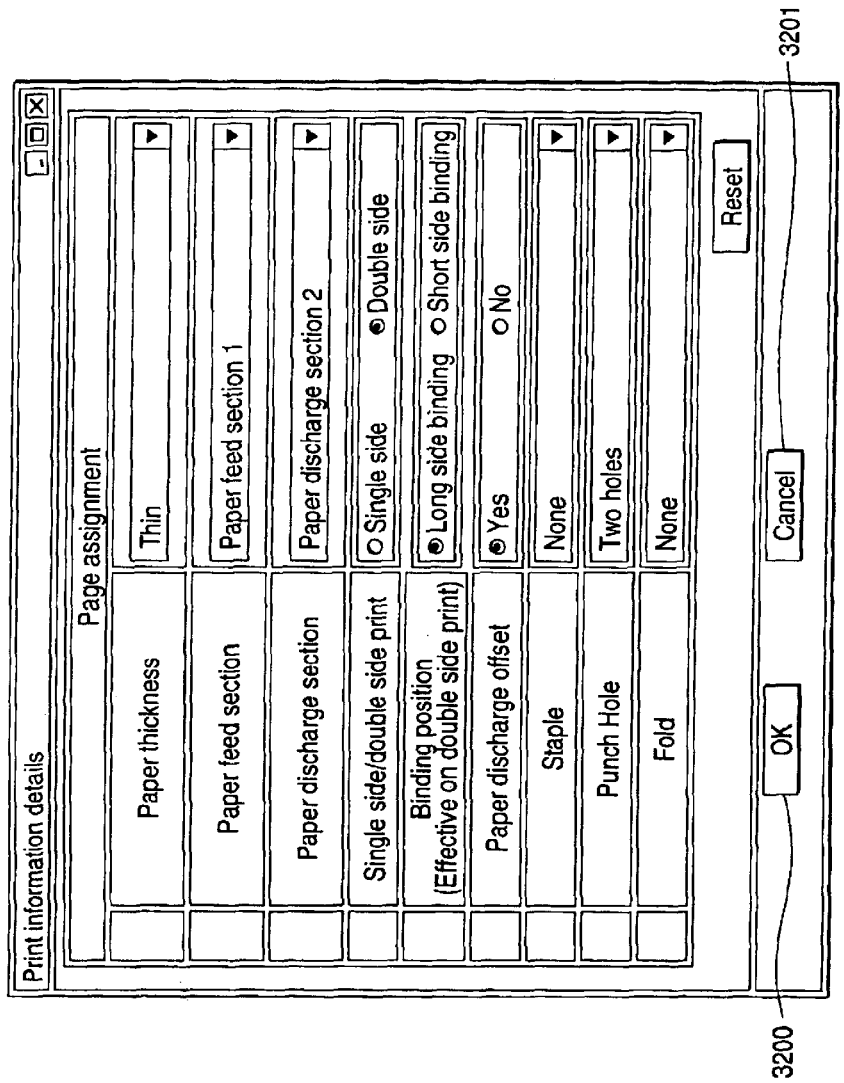
FIG. 21 is a drawing to show a state in which setting is changed on the detailed instruction screen in FIG. 20.
Figure 22:
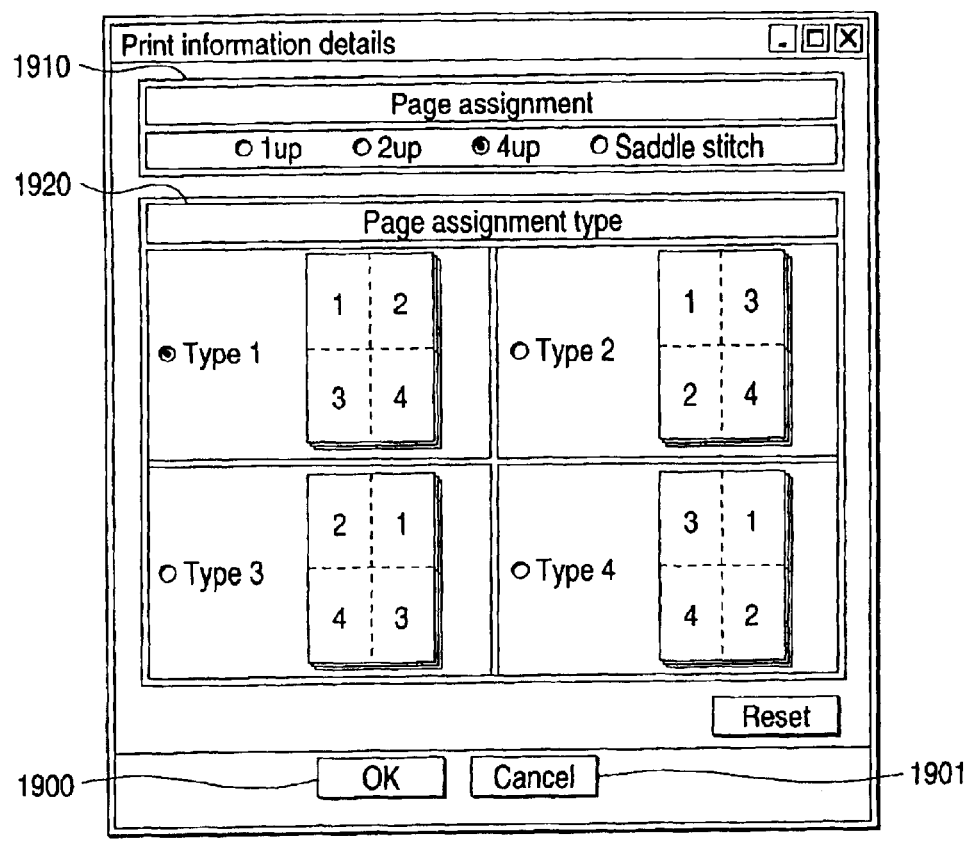
FIG. 22 is a drawing to show a screen for specifying page assignment as the next screen to the detailed setting in FIG. 21.
Figure 23:
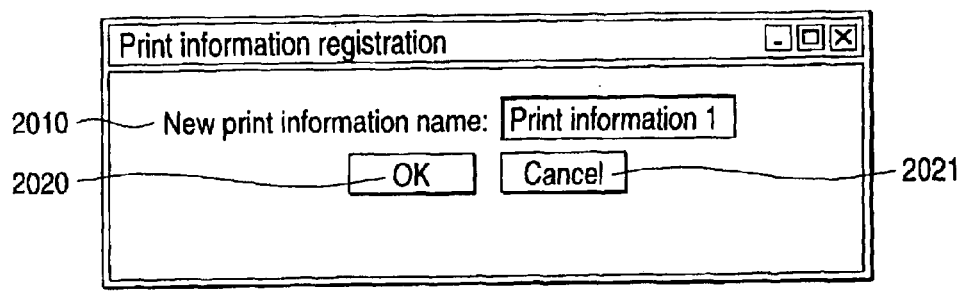
FIG. 23 is a drawing to show a state in which a new print information name is entered to register setup print information.
Figure 24:
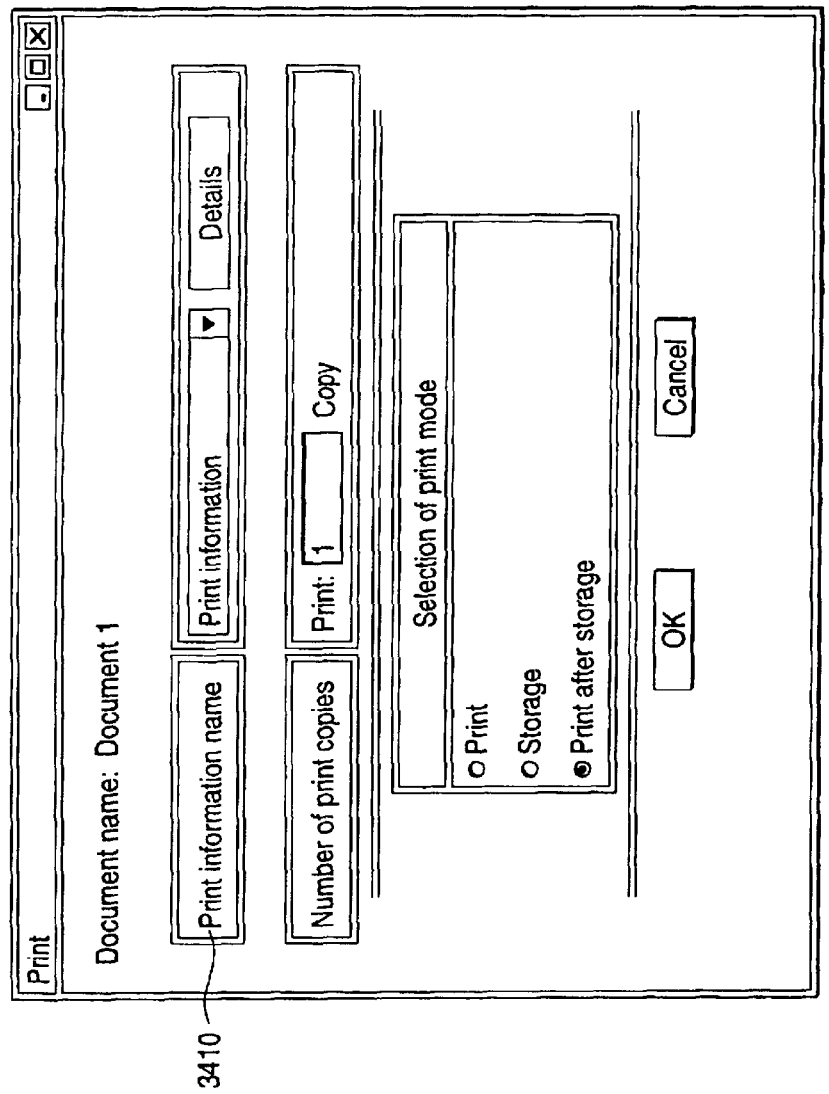
FIG. 24 is a drawing to show a state in which the print information name registered in FIG. 23 is displayed as selectable print information.
Figure 25:
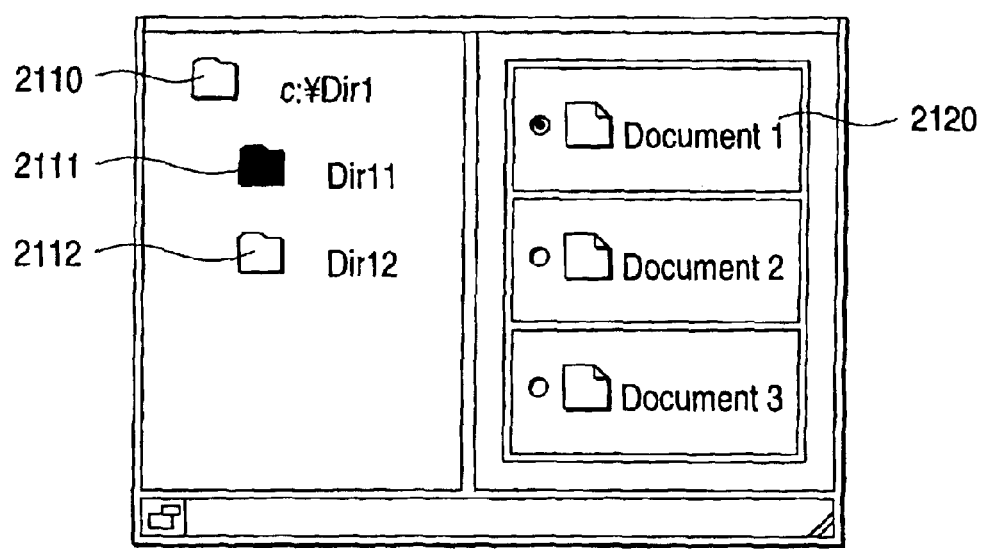
FIG. 25 is a drawing to show a print information selection screen.

First, the reprinting procedure described in the first embodiment, the second embodiment, the third embodiment will be discussed using an example. As shown in FIG. 15, Document1 (1610) is stored in an archive 202 as a job. Reprinting instructions from a computer 300 to a printer controller 200 are given using instruction screens shown in FIGS. 18, 20, 22, and 25, for example. First, a document to be reprinted is selected. FIG. 25 shows an instruction screen for selecting a document in the archive. Directories Dir11 (2111) and Dir12 (2112) exist under a directory Dir1 (2110). Further, files Document1 (2120), Document2 (2121), and Document3 (2122) exist under the directory Dir11 (2111). Here, for example, the Document1 (2120) is selected. The file Document1 (2120) is Document1 (1610) in FIG. 16. Next, reprinting instruction or setting change is executed. FIG. 18 shows an instruction screen for reprinting a document in the archive. The selected Document1 (1610) is displayed in a document name 1700. A print information name 1710 lists print information that the Document1 (1610) has for selection. Number of copies 1720 enables the user to enter the number of print copies. Like the print job 1300 shown in FIG. 11, the Document1 (1610) consists of print data 1611 and added print information 1612 added when it is spooled. The added print information 1612 describes information in the format specified when the print job is spooled. To print the document intact without changing the format, the added print information 1612 may be selected, whereby the added print information 1612 is selected as the print information of the print job spooled at the reprinting time and the document can be printed in the format. To change a part of the contents of the added print information 1612, if the added print information 1612 is selected and a detail button 1711 is selected, the contents of the added print information 1612 can be changed for printing the document. FIG. 21 shows an example of a detailed setting instruction screen of the added print information 1612. If setting is changed and an OK button 3200 is selected, the screen display returns to the instruction screen in FIG. 18. If an OK button 1740 in FIG. 18 is pressed, the document can be printed based on the contents of changing the added print information 1612. Next, a method of printing the Document1 (1610) in a format different from that at the spooling time will be discussed. Standard print information 1620 used as a model for preparing print information is stored in the archive 202. The print information of the Document1 (1610) is the added print information 1612 only. However, in the print information name field of the print information name 1710 in FIG. 18, in addition to "added print information," "standard print information" is also displayed as shown in the print information name field of print information name 3310 in FIG. 19. The standard print information is print information based on automatic selection or none, such as automatic selection for paper thickness 1810, automatic selection also for paper feed section 1820, and none for spool 1870, as shown in FIG. 20. For printing in a fully automatic format or with some change in the fully automatic format without printing in a special mode, "standard print information" is selected. Next, a method of registering changed print information will be discussed. To change added print information or standard print information, setting change can also be registered as print information, as required. If an OK button 1900 on an instruction screen in FIG. 22 with change made as mentioned above is pressed, a print information registration screen, for example, as shown in FIG. 23 is displayed. A print information name is entered in a new print information name 2010 and an OK button 2020 is pressed, whereby the entered print information name is displayed in a print information name 3410 shown in FIG. 24. The "standard print information" is thus used as a setting model, whereby it is made possible to save print information setting time and trouble. More than one frequently used print setting is registered, whereby it is made possible to reprint with dispatch.

Next, a fifth embodiment of the invention will be discussed in detail.

Figure 17:
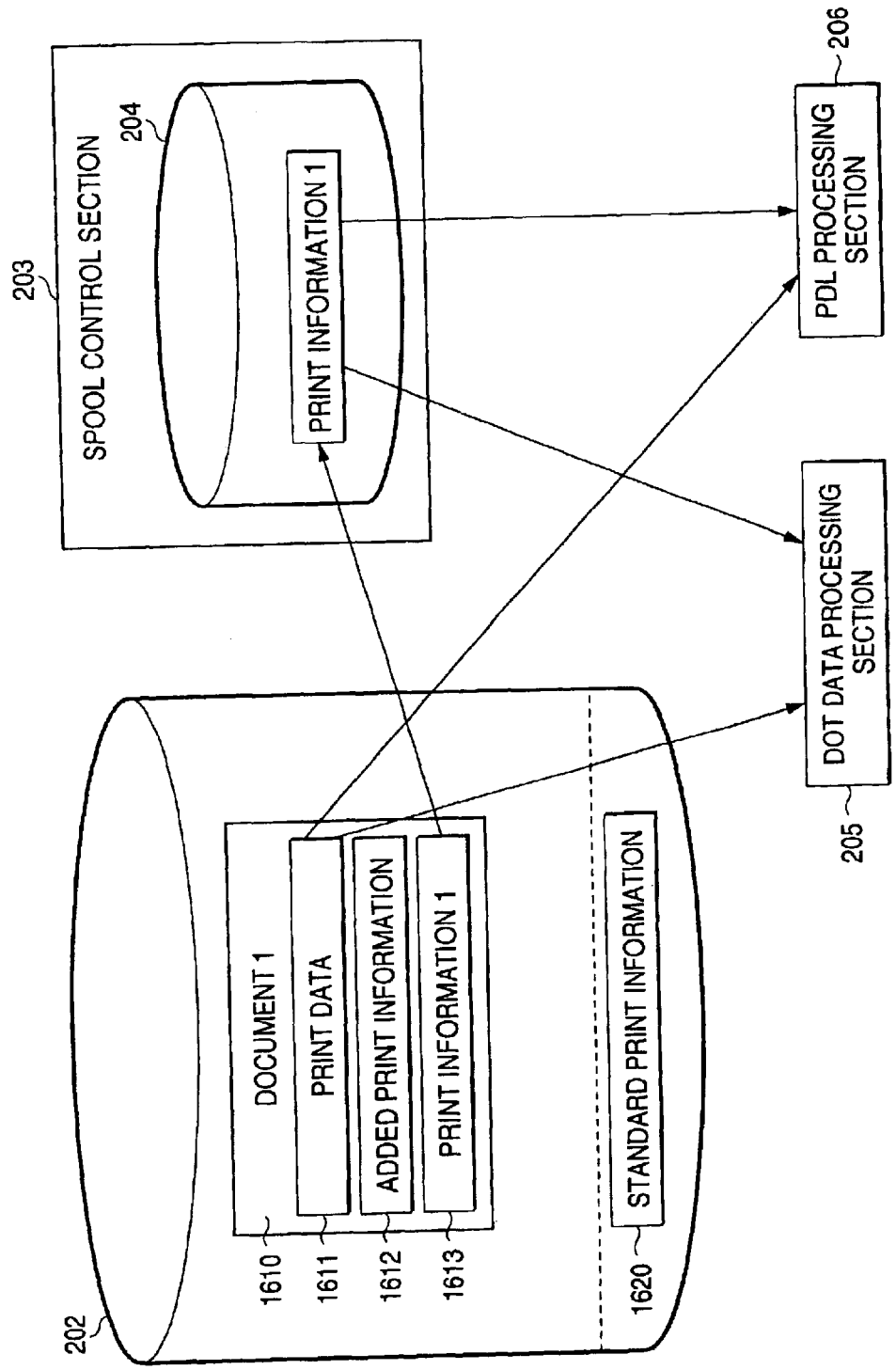
FIG. 17 is a drawing to show a data flow for moving only print information to a spool for reprinting.

First, the reprinting procedure described in the first embodiment, the second embodiment, the third embodiment, and the fourth embodiment will be discussed using an example. FIG. 17 is a state diagram to show storing of Document1 (1610) in an archive 202 as a print job. The Document1 (1610) is made up of print data 1611 and added print information 1612 and print information 1 (1613) as print information. When a reprinting instruction of the Document1 (1610) is given from a computer 300, a spool control section 203 moves print information to a spool 204. For example, "print information 1" is selected in a print information name 3410 on an instruction screen in FIG. 24, the contents of the print information 1 (1613) are, for example, as shown in FIG. 26. A dot image processing section 205 or a PDL processing section 206 interprets the print information 1 (1613) and processes print data in the storage location indicated in a print data storage location 204. Thus, the spooled print job contents are print information only and print data of a comparatively large data size is accessed after the location of the print data is found from the print information, whereby it is made possible to reduce the copy time and the hard disk capacity.

When a print instruction is given whit various instructions, it is made possible to lighten the processing burden on the computer and shorten the print processing time required for the computer.

A print job is stored in the archive, whereby it is made possible to reprint the print job in the format responsive to the application as many times as required.

What is claimed is:

1. A print system comprising:
   a computer; comprising a logical printer driver for making print instructions of a prepared document, preparing a PDL document and print information from the document, and spooling as a print job, wherein the print information comprises storage data indicating whether the print job is to be archived in a printer and storage format data indicating in what format the print job should be archived; wherein:
   the printer is connected to the computer, and comprises:
   a spool control section for receiving the spooled print job;
   a PDL processing section for processing the PDL document in accordance with the print information of the print job;
   an interpreter for interpreting the PDL document and expanding the PDL document into a dot image;
   an output work for storing the dot image;
   an output control section for controlling the output work; and
   a printer engine for printing the dot image transmitted from the output control section;
   wherein the document is printed in a format specified by the computer.

2. The print system as claimed in claim 1 wherein:
   the computer further comprises a print instruction section for updating the print information of the print job and making print instructions, and
   the printer further comprises an archive for storing the print job from the spool control section; and an archive control section for spooling the print job from the print instruction section.

3. The print system as claimed in claim 1 further comprising an archive for storing a pair of PDL document and printer information and a pair of dot image and print information as the print job.

4. The print system as claimed in claim 1, wherein the print information further comprises at least one of:
   number of copies data indicating the number of copies desired;
   paper size data indicating the size of paper to be printed upon;
   paper feed section data indicating which paper source the printer will use;
   paper discharge section data indicating where output will be discharged from the printer;
   output format data indicating folding patterns;
   double sided print data indicating whether double sided printing is activated;
   binding position data indicating the position of bindings; and
   stapling data indicating the number and position of staples.

5. The print system as claimed in claim 1, wherein
   the printer further comprises an archive for storing the print job based on a value of the storage data; and
   the print information of the print job stored in the archive can be updated by the computer; and
   the stored print job can be printed according to the updated print information.

6. The print system as claimed in claim 1 further comprising an archive for storing a pair of PDL document and printer information or a pair of dot image and print information as the print job.

7. The print system as claimed in claim 1, wherein the storage data and storage format data are chosen by a user through an interface in the computer.

8. The print system as claimed in claim 1, wherein the print information associated with the PDL document is replaceable.

9. The print system as claimed in claim 1, wherein the storage format data indicates whether the print job should be stored in a PDL format or a dot image format.

10. A print system comprising:
    a computer comprising a logical printer driver for making print instructions of a prepared document, preparing a PDL document and print information from the document, and spooling as a print job, wherein the print information comprises storage data indicating whether the print job is to be archived in a printer and storage format data indicating in what format the print job should be archived, wherein:
    a printer is connected to the computer, and comprises:
    a spool control section for receiving the spooled print job;
    an archive for storing the print job;
    an interpreter for interpreting the PDL document in the print job and expanding the PDL document into a dot image;
    an output work for storing the dot image; and
    an output control section controlling storage of the dot image stored in the output work and the print information in the archive as the print job.

11. The print system as claimed in claim 10, wherein the computer further includes a print instruction section for updating the print information of the print job and making print instructions, and wherein the printer further includes:
an archive control section for spooling the print job from the print instruction section; and
a dot image processing section for processing to a dot image in accordance with the print information,
wherein the archive stores the print job transmitted from the spool control section.

12. The print system as claimed in claim 10 wherein the archive stores a pair of PDL document and printer information and a pair of dot image and print information as the print job.

13. The print system as claimed in claim 10, wherein the print information further comprises at least one of:
number of copies data indicating the number of copies desired;
paper size data indicating the size of paper to be printed upon;
paper feed section data indicating which paper source the printer will use;
paper discharge section data indicating where output will be discharged from the printer;
output format data indicating folding patterns;
double sided print data indicating whether double sided printing is activated;
binding position data indicating the position of bindings; and
stapling data indicating the number and position of staples.

14. The print system as claimed in claim 10, wherein
the print information of the stored print job in the archive can be updated by the computer; and
the stored print job can be printed according to the updated print information.

15. The print system as claimed in claim 10, further comprising:
a PDL processing section for processing the PDL document in accordance with the print information of the print job; wherein
the archive also stores a PDL document for later retrieval.

16. The print system as claimed in claim 10 further comprising an archive for storing a pair of PDL document and printer information or a pair of dot image and print information as the print job.

17. The print system as claimed in claim 10, wherein the print information associated with the PDL document is replaceable.

18. The print system as claimed in claim 10, wherein the storage format data indicates whether the print job should be stored in a PDL format or a dot image format.

19. The print system as claimed in claim 10, wherein the print information comprises storage data indicating whether the print job is to be archived in the printer and storage format data indicating in what format the print job should be archived.

20. A print system comprising:
a computer; comprising a logical printer driver for making print instructions of a prepared document, preparing a PDL document and print information from the document, and spooling as a print job, wherein the print information comprises storage data indicating whether the print job is to be archived in a printer and storage format data indicating in what format the print job should be archived; wherein:
the printer is connected to the computer, and comprises:
a spool control section for receiving the spooled print job;
a PDL processing section for processing the PDL document of the print job;
an interpreter for interpreting the PDL document and expanding the PDL document into a dot image;
a dot image processing section for processing the dot image;
an output work for storing the dot image;
an output control section for controlling the output work; and
an archive for storing the print job.

21. The print system as claimed in claim 20 wherein the archive stores a pair of PDL document and printer information and a pair of dot image and print information as the print job.

22. The print system as claimed in claim 20, wherein the print information further comprises at least one of:
number of copies data indicating the number of copies desired;
paper size data indicating the size of paper to be printed upon;
paper feed section data indicating which paper source the printer will use;
paper discharge section data indicating where output will be discharged from the printer;
output format data indicating folding patterns;
double sided print data indicating whether double sided printing is activated;
binding position data indicating the position of bindings; and
stapling data indicating the number and position of staples.

23. The print system as claimed in claim 20, wherein
the archive stores the print job based on a value of the storage data; and
the print information of the print job stored in the archive can be updated by the computer; and
the stored print job can be printed according to the updated print information.

24. The print system as claimed in claim 20, wherein:
the output control section controls the storing of the dot image stored in the output work and the print information in the archive as the print job.

25. The print system as claimed in claim 7 further comprising an archive for storing a pair of PDL document and printer information or a pair of dot image and print information as the print job.

26. The print system as claimed in claim 20, wherein the storage data and storage format data are chosen by a user through an interface in the computer.

27. The print system as claimed in claim 20, wherein the print information associated with the PDL document is replaceable.

28. The print system as claimed in claim 20, wherein the storage format data indicates whether the print job should be stored in a PDL format or a dot image format.

29. The print system as claimed in claim 20, wherein the dot image processing section and the PDL processing section are arranged in parallel between the spool control section and the outport work.

30. A print system comprising:

a computer; and a printer connected directly to the computer or indirectly to the computer via a network, wherein the computer comprises a logical printer driver for making print instructions of a document prepared, preparing a PDL document and print information from the document, and spooling as a print job, and wherein the printer comprises:

a spool control section for receiving the print job spooled;

a PDL processing section for processing the PDL document in accordance with the print information of the print job;

an interpreter for interpreting the PDL document and expanding the PDL document into a dot image;

an output work for storing the dot image;

an output control section for controlling the output work; and a printer engine for printing the dot image transmitted from the output control section;

wherein the document is printed in a format specified by the computer;

said print system further including an archive for storing a pair of PDL document and printer information and a pair of dot image and print information as the print job.

31. A print system comprising:

a computer; and a printer connected directly to the computer or indirectly to the computer via a network, wherein the computer comprises a logical printer driver for making print instructions of a prepared document, preparing a PDL document and print information from the document, and spooling as a print job, wherein the printer comprises:

a spool control section for receiving the print job spooled;

a PDL processing section for processing the PDL document of the print job;

an interpreter for interpreting the PDL document and expanding the PDL document into a dot image;

a dot image processing section for processing the dot image;

an output work for storing the dot image;

an output control section for controlling the output work; and an archive for storing the print job, wherein the archive stores a pair of PDL document and printer information and a pair of dot image and print information as the print job.

* * * * *